May 3, 1927.
E. K. BAKER
VEHICLE WHEEL
Filed Oct. 23, 1920
1,627,369
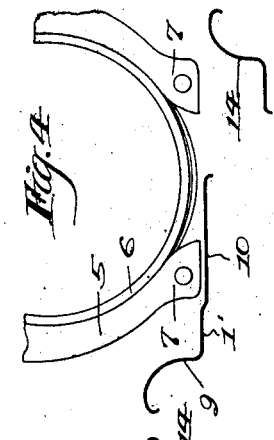
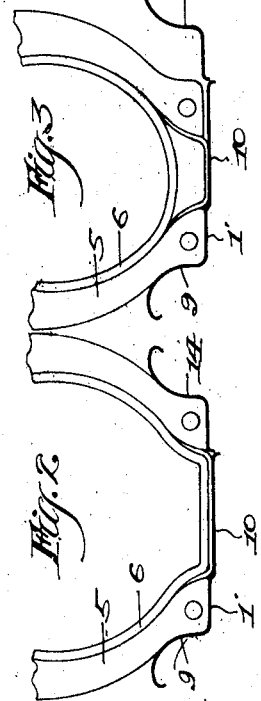
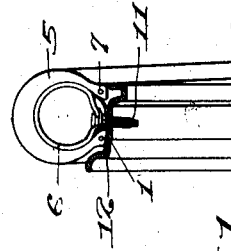
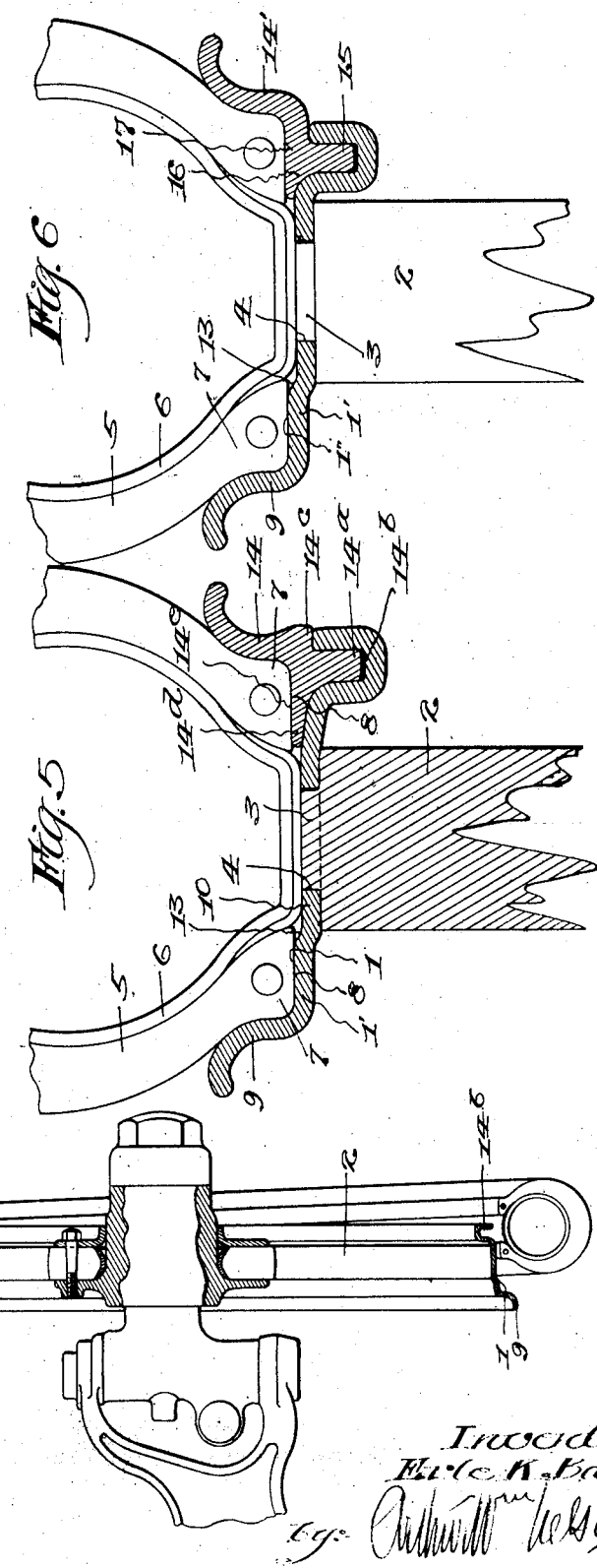

Patented May 3, 1927.

1,627,369

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

VEHICLE WHEEL.

Application filed October 23, 1920. Serial No. 418,871.

My invention relates generally to improvements in vehicle wheels, but relates more particularly to improvements in wheels designed to carry a pneumatic tire, such for example as automobile wheels, trailer vehicle wheels, etc.

The use of pneumatic tires for vehicles has many advantages, such as enabling vehicles to be operated at greater speed and with greater safety, with more comfort, with less power, and upon roads which would be practically impassible for vehicles not so equipped. Furthermore the life of the vehicle, and its mechanism are increased by the use of pneumatic tires. Pneumatic tires likewise have certain inherent features of objection, such for example, as their susceptibility of being punctured, of being bruised by engagement with sharp unyielding objects, and of blowing out due to a number of different causes. As a result, it becomes necessary to remove pneumatic tires from time to time or at least to provide a wheel construction such that if removal should become necessary it can be accomplished with little delay. Several expedients have been devised to this end, among which may be noted a wheel provided with a demountable tire carrying rim, a wheel provided with a tire carrying rim having a removable side flange, and special forms of demountable rims having features designed to facilitate the removal of the pneumatic tire from its carrying rim or support. The wheel structure provided with a demountable tire carrying rim has the advantage of enabling a quicker change on the road due to the fact that an inflated tire carried upon a spare rim can be substituted by the mere removal of the demountable rim. Such practice, however, involves the carrying of additional peripheral weight which is destructive to a pneumatic tire. Again the use of a demountable rim involves a duplication of effort for the rim must not only be removed from the wheel, but the tire must be removed from the rim. The latter, however, can be attended to at the convenience of the user, and in a place where suitable facilities are available.

A vehicle wheel provided with a fixed tire carrying rim eliminates the objectionable feature of unecessary peripheral weight, but involves the necessity of making the tire change, i. e. removing it from its supporting or carrying band on the road at such time, and in such place as a tire replacement or change must be made. Such a tire change must often be made under very disagreeable conditions and such wheel constructions, as heretofore provided, have been of such construction as to make tire changing difficult, thus forcing the more expensive use of the less desirable separate demountable tire containing rim involving the elements of increased cost and additional weight.

The general object of my invention is to provide a wheel construction, which shall enable the removal and replacement of tires in less time, with less effort, and with less skill.

It is also an object of my invention to provide a wheel construction, which shall so simplify the removal and replacement of tire casings that a fixed rim, i. e. a tire carrying rim or band, which is a fixed part of the wheel shall be entirely practicable, thus making available a pneumatic tire carrying wheel, embodying the desirable characteristics of lightness, low cost, and other advantages inherent in such a structure.

Again, it is an object of my invention to provide a wheel construction having the advantageous characteristics mentioned, and which can be readily designed to accommodate the different forms of tire casings now in use.

My invention consists generally in the form, arrangement, construction and co-operation of the parts, whereby the above named objects, together with others that will appear hereinafter are attainable; and my invention will be more readily understood by reference to the accompanying drawings, which illustrate what I consider, at the present time, to be the preferred embodiment thereof.

In said drawings:

Fig. 1, is a vertical sectional view of a vehicle wheel embodying my invention, illustrating the buttoning of a tire thereon.

Figs. 2, 3, and 4 are diagrammatic sectional views illustrating steps in the operation of making a tire change; and Figs. 5 and 6, are transverse sectional views illustrating different forms of my invention.

While the drawings illustrate two forms of my invention, they both embody certain features of like nature. As here shown, they both embody a fixed annular member, which forms part of the tire casing receiving and holding means, together with detachable means serving to complete the same. To the corresponding parts in the respective views, therefore, the same reference character is applied. Thus 1, represents a metal band, which, as here shown is supported by or tensioned upon a plurality of wooden spokes 2, the outer ends of which have tenons 3 which enter openings 4 provided in the metal band for that purpose. 5 represents a pneumatic tire casing provided with the usual inner tube 6, and which has base or bead portions 7 of the straight side type adapted for use with wheel constructions of that type. The bottom faces 8 of the tire base are accurately sized for use with a given sized wheel, and the term "tire base diameter" in the claims, refers to the distance between diametrically opposite points of the faces 8. It is essential that the diameter of the tire base shall be substantially the same as the diameter of the seat or support upon which it rests when on the wheel, so that it may be firmly held thereon by the pressure of the air and thus anchored against any movement relative to its carrying means. Unless this be so there is danger of the tire blowing over the side flanges or becoming injured and eventually destroyed by chafing action between the tire and its support. As a result of the snug fit between the tire base and its support considerable difficulty is encountered in removing the tire from or placing it upon the wheel due to the fact that the base or toe of the tire drags along the outer face of the wheel or tire supporting band. The result of this is that the removal and replacement of the tire has heretofore been difficult and, in many instances, extremely aggravating.

I have devised a construction which enables the removal and replacement of the tire with the greatest ease and yet, which is of such construction as to provide the necessary snug fit between the base of the tire and its support. As will appear the construction devised also has many desired characteristics such as lightness, durability, cheapness, etc. To this end, I provide an elevated or raised tire base support 1', adjacent the integral back flange 9, the face 1'' of which is of a diameter substantially the same as the tire base diameter. There is thus provided a relatively depressed remaining portion 10 of the band 1, the diameter of which is less than tire base diameter. The portion 10 of the band 1 is preferably cylindrical in form, except for the near edge or side which is preferably formed for co-action with a detachable front flange, as hereinafter described. By making the wheel in this way I am enabled to place the valve stem 11 through the valve stem opening 12, and then button the tire on the wheel, as is well shown in Fig. 1. No appreciable resistance is met in thus buttoning the tire on the wheel, as the tire bases are accommodated by the depressed or reduced portion of the band. It is then but necessary to move the tire transversely the short distance necessary to position the back base of the tire on elevated support 1'. To assist in this operation, I preferably gently slope or incline the band between the depressed and elevated portions as indicated at 13. The tire base on the near side of the tire can be moved inwardly sufficient to enable placement of the removable side flange 14 as is probably best shown diagrammatically in Fig. 3. Obviously the removal of the tire is a mere reversal of the operation described and hence the diagrammatic views 3 and 4 may be taken to illustrate either the placing of the tire on or the removal of the tire from the wheel. Considering Fig. 3 as illustrating the removal of the tire, the base of the tire is moved inwardly to permit removal of the detachable side flange 14, and, considering it as illustrating replacement of the tire, the tire base is moved inwardly to permit replacement of the side flange. So also with respect to Fig. 4, this illustrates both the replacement and removal of the tire, in both of which instances the detachable side flange is removed to some convenient position. For illustrative purposes the side flange is shown removed but adjacent the wheel.

If desired, instead of buttoning the tire on the wheel, as described, the tire may be simply pushed axially of the wheel, the valve stem being pushed inwardly to clear the band.

The removable or detachable flange 14 may assume various shapes for co-action with wheel structures of different kinds. Thus in Fig. 5, it is provided with a relatively long downwardly extending portion 14$^a$ entering into a groove provided by the retaining channel 14$^b$ of the band 1. Likewise, it is provided with a portion 14$^c$ which overhangs and rests upon the upturned portion of the channel 14$^b$. The detachable flange 14 is also provided with an inwardly extending tongue portion 14$^d$ having a face portion 14$^e$, the diameter of which corresponds to the diameter of the face portion 1''. That is to say it is of tire base diameter. It thus forms an accurately dimensioned seat for the tire base and completes a wheel structure adapted to receive a symmetrical tire and to hold it against distortion. Therefore in the replacement of the tire either tire base can be started on first indiscriminately and a perfect fit be assured.

In Fig. 6 a slightly different form of detachable side flange 14' is shown. It is provided with a depending portion 15, which is adjacent the inner edge 16 of the tire base supporting portion 17, but is still provided with a slightly inwardly extending tongue portion, whereas the construction shown in Fig. 5 is provided with a relatively long inwardly extending tongue portion as before described.

It will be understood that the detachable side front flange 14 is transversely split c cut at one point to permit removal and replacement in the retaining channel of the wheel.

From the foregoing description it is obvious that my invention is susceptible of some variation in form and I do not, therefore, wish to be limited to the specific constructions herein shown and described, except only as may be necessary by limitations in the hereunto appended claims.

I claim:

1. A vehicle wheel construction embodying therein peripheral, pneumatic tire receiving means formed of an annular band having an integral tire retaining back flange, having an annular elevated tire base seat of substantially tire base diameter formed therein adjacent the back flange, having a substantially cylindrical portion of less than tire base diameter, having an inclined portion extending between the elevated tire base seat and the substantially cylindrical portion of less than tire base diameter, and having a channel-shaped front flange receiving portion of less than tire base diameter and not greater in diameter than said cylindrical portion of less than tire base diameter.

2. A vehicle wheel construction embodying therein peripheral pneumatic tire receiving means formed of an annular band having an integral tire retaining back flange, having an annular elevated tire base seat of substantially tire base diameter formed therein adjacent the back flange, having a substantially cylindrical portion of less than tire base diameter, and having an inclined portion extending between the elevated tire base seat and the substantially cylindrical portion of less than tire base diameter, said substantially cylindrical portion terminating in a vertically disposed channel shaped detachable front flange receiving portion.

3. A vehicle wheel construction embodying therein peripheral pneumatic tire receiving means formed of an annular band having an integral tire retaining back flange, having an annular elevated tire base seat of substantially tire base diameter formed therein adjacent the back flange, having a portion of less than tire base diameter, having a channel-shaped front flange receiving portion of less than tire base diameter and not greater in diameter than said last mentioned portion of less than tire base diameter and a detachable front flange having a tire base seat of substantially tire base diameter.

4. A vehicle wheel construction embodying therein peripheral, pneumatic tire receiving means formed of an annular band having a fixed back flange, a detachable front flange, spaced tire base seats of substantially tire base diameter, and a portion intermediate said tire base seats of sufficiently less than tire base size to permit buttoning of the tire on the band when the detachable front flange is removed together with front flange receiving means of less than tire base diameter, said flange receiving means being of a diameter not greater than said portion intermediate the tire base seats.

In testimony whereof, I have hereunto set my hand this 12th day of October, 1920.

ERLE KING BAKER.